United States Patent
Karnes

(10) Patent No.: US 6,978,886 B2
(45) Date of Patent: Dec. 27, 2005

(54) NON-METALLIC DRIVE CHAIN

(75) Inventor: Robert B. Karnes, Hanover, MA (US)

(73) Assignee: Globe Composite Solutions, Ltd., Dallas, TX (US)

( * ) Notice: Subject to any disclaimer, the term of this patent is extended or adjusted under 35 U.S.C. 154(b) by 0 days.

(21) Appl. No.: 10/631,046

(22) Filed: Jul. 29, 2003

(65) Prior Publication Data

US 2005/0023113 A1 Feb. 3, 2005

(51) Int. Cl.[7] .............................................. B65G 17/06
(52) U.S. Cl. ..................................... 198/852; 198/853
(58) Field of Search ............................... 198/850, 851, 198/852, 853; 474/207, 209

(56) References Cited

U.S. PATENT DOCUMENTS

| | | | |
|---|---|---|---|
| 4,272,952 A | | 6/1981 | Graham |
| 4,636,181 A | * | 1/1987 | Savolainen et al. ......... 474/207 |
| 5,131,723 A | | 7/1992 | Roling |
| 5,305,872 A | * | 4/1994 | Hutton ....................... 198/853 |
| 6,321,523 B1 | * | 11/2001 | Christmas .................. 198/851 |
| 6,666,328 B2 | * | 12/2003 | Sykora ....................... 198/853 |
| 6,691,862 B1 | * | 2/2004 | Mogens ...................... 198/851 |

FOREIGN PATENT DOCUMENTS

| | | |
|---|---|---|
| DE | 330 369 C | 12/1920 |
| DE | 93 13 261 U | 11/1993 |
| FR | 1 403 295 A | 6/1965 |
| FR | 2 662 225 A | 11/1991 |

OTHER PUBLICATIONS

International Search Report dated Dec. 9, 2004.

* cited by examiner

Primary Examiner—James R. Bidwell
(74) Attorney, Agent, or Firm—Jenkens & Gilchrist

(57) ABSTRACT

A drive chain is made up of links injection molded of fiber-reinforced nonmetallic material. The chain links feature pivot bearings molded integrally to the links, which take all loads due to drive tension and relieve the connecting pins of all shear stress. The links also have all features for attachment to driven components molded integrally. The moving structural parts are separated by nonmetallic bushings filled with solid lubricating additives to reduce friction and wear. The chain rollers may also incorporate metallic ball bearings to reduce friction drag on guide track.

36 Claims, 1 Drawing Sheet

NON-METALLIC DRIVE CHAIN

FIELD OF THE INVENTION

This invention relates to drive chains and in particular to conveyors, in which drive chains carry articles attached to them. One example of such conveyors is a towline conveyor.

BACKGROUND OF THE INVENTION

Conventional steel drive chain is built up of flat elements which are the product of a stamping or blanking process. Molding a chain link from a nonmetallic material enables integration of three-dimensional features into the link such as end bearings and mounting bosses for a driven component, thereby distributing stresses, reducing parts count and simplifying assembly.

Steel drive chain is an outstandingly elegant machine element, the result of centuries of developing metals technology. It makes use of an inexpensive, well understood material (steel strip) subjected to a simple operation (precision stamping) that actually improves the material characteristics for the purpose (cold working). It is easily assembled, totally modular and adaptable to any power level. Properly maintained, its mechanical efficiency is 98 percent or better.

It has, however, certain disadvantages, including the transmission of drive tension via shear through small diameter link pins, the difficulty of keeping the chain lubricated, and the tendency of lubricants to attract dirt, which can rapidly wear the chain.

In general, and without regard to the novel features of the present invention, performance of a nonmetallic drive chain equaling or exceeding that of conventional steel in heavy duty, industrial or commercial applications is only made possible by the ability to create optimal anisotropic properties for maximum structural efficiency and minimum mass. This is accomplished using heavily fiber reinforced materials, utilizing molding techniques well established in prior art to align the reinforcement in the direction of the local tensile stress. It is crucial to achieving the performance, on a strength-to-weight basis, exceeding that of metals that is the primary reason for resorting to reinforced composites.

SUMMARY OF THE INVENTION

One embodiment is directed toward a chain design comprising links having male and female ends. Although the design could be executed in steel or other metals, the chain most preferably is made of a polymer-based composition. The male ends fit in the female ends to transfer tension through the links, eliminating shear through link pins. In a preferred embodiment, an integrally molded pivot bearing is formed by nesting diameters of the male and female link ends, separated and lubricated by a sleeve bushing. A preferred high strength polymer composition includes a polyarylamide matrix reinforced with glass fibers aligned within the links in the direction of the tensile force.

Features of the Invention Include:

1. Chain links injection molded from fiber-reinforced nonmetallic material to near net shape, incorporating all necessary features for drive connections, with the reinforcement oriented to the local principal tensile stress.

2. Chain articulation provided by pivot bearings molded integral to the linkplates and which bear the drive tension, thereby relieving the connecting pins of all drive forces.

3. The entire chain built up from opposed pairs of universal linkplates, so that chain length may be adjusted to any desired integer number of pitches.

4. Closure of a loop of chain by spreading of the end link pair.

5. All sliding contacts with permanently lubricated solid bearing inserts.

The advantages of the present invention, with respect to conventional metallic drive chain, are:

1. The integral pivot bearing takes drive tension, relieving the connecting pin of all drive loads.

2. Reduced parts count, with only two (plain and component-mounting) link plates required to make up chain to length equal to any integer number of pitches, and with any desired spacing between driven components, e.g. carriages.

3. Integrated features, such as carriage mounting bosses, which are usually welded in conventional chain and are often a source of trouble due to embrittlement in the heat affected zone.

4. Reduced weight (approximately 25 percent less than steel chain of equal performance), therefore reduced inertial loads and energy consumption in the drive system.

5. Vibration/noise reduction and shock absorption due to the damping (hysteretic) nature of the impact-modified link material.

6. Reduced maintenance due to the permanently lubricated bearing inserts not requiring periodic greasing.

7. Reduced environmental impact because no lubricants are required.

8. Ease of assembly, with only common snap ring pliers and no high forces required to install or remove the link pin retaining ring.

BRIEF DESCRIPTION OF THE DRAWINGS

The sole FIGURE illustrates a cross-section of a section comprising two links of a composite chain of the invention.

DETAILED DESCRIPTION OF THE ILLUSTRATED EMBODIMENT

Chain Design

Figure 1:
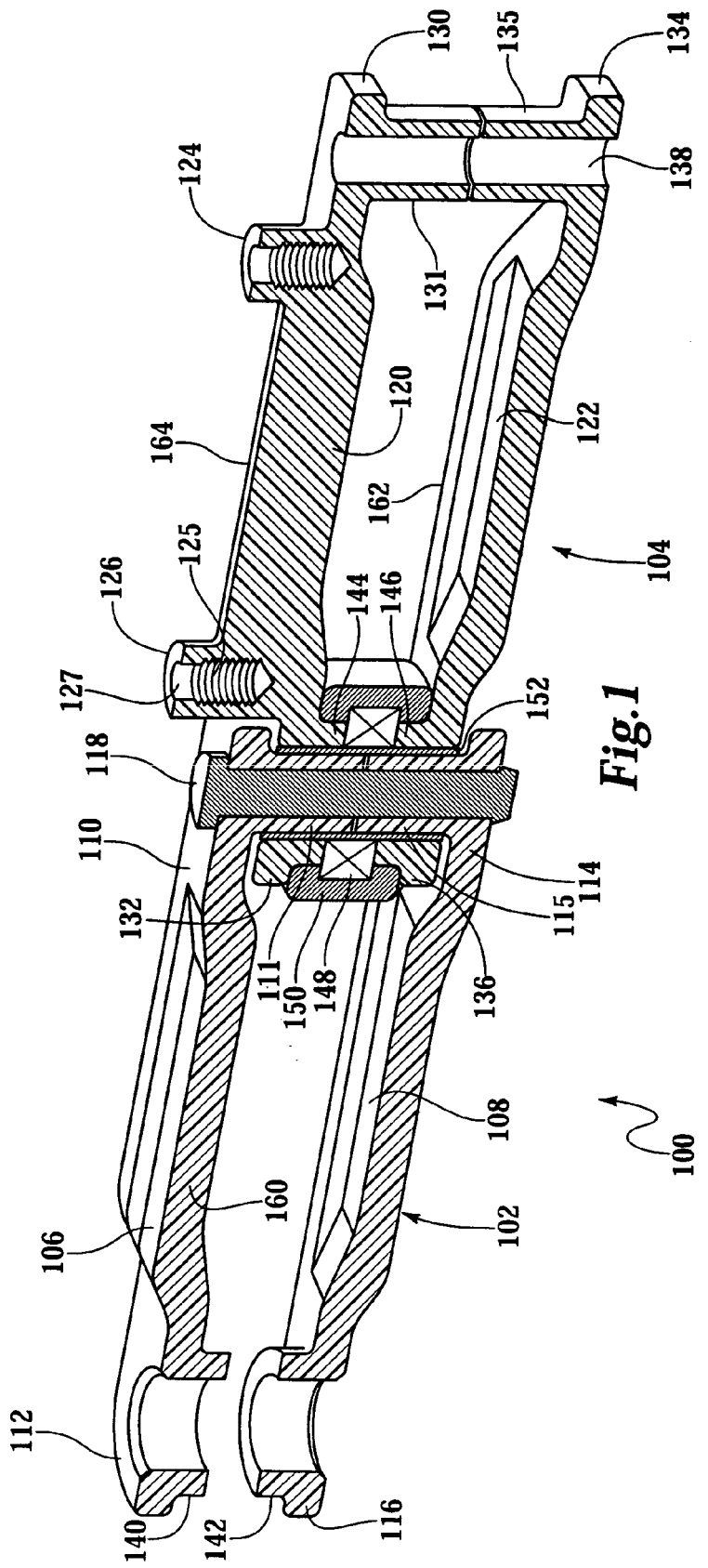

The FIGURE illustrates a cross-section view of section 100 of a chain of the invention, preferably a composite polymer chain, comprising a basic link 102 and a carriage mounting link 104. The basic link 102 comprises plain upper member 106 and plain lower member 108. Generally the upper and lower members may be formed in any number of suitable configurations, including plates, ribs, bars, rods, and lattices. For ease of understanding, the members will be referred to as plates. The plain upper plate 106 comprises a male end 110 and a female end 112. The male end 110 comprises a boss 111 extending perpendicular to a plane in which the plate 106 articulates. Similarly, the plain lower plate 108 comprises a male end 114 and a female end 116; male end 114 comprising a boss 115. The male ends 114 and 110 are maintained in fixed relation, and preferably connected, with composite link pin 118. The female ends 112 and 116 are preferably maintained in a spaced-apart relation and receive the male ends of an adjacent link.

The carriage link 104 is similar to the basic link 102 comprising an upper plate 120 and a plain lower plate 122. However the upper plate 120 also comprises a carriage-connecting structure. The illustrated carriage-connecting structure comprises first and second bosses 124 and 126 for connecting the towline carriage link 104 to a unit, for example, a carriage or other item to be towed by the towline. The upper plate 120 is therefore also referred to as a boss plate or carriage plate.

The carriage mounting bosses 124 and 126 are preferably molded with internal threads 125 by means of an externally threaded, slightly oversized (to allow shrinkage) mold insert that is ejected from the mold with the part, then unscrewed from it. The internal threads are made to have an interference locking feature 127 by grinding off the edges of the last few threads on the mold insert, hence causing the removed volume to fill with the molded material. Due to the somewhat elastomeric, high friction nature of the preferred impact modified matrix material, this interference design can provide sufficient holding torque on a bolt for several cycles of insertion and removal.

The upper plate 120 comprises a male end 130 with boss 131 and a female end 132. Likewise, the lower plate 122 comprises a male end 134 with boss 135 and a female end 136. The male ends 130 and 134 define a channel 138 for receiving a composite link pin, e.g., link pin 118. As better shown in connection with the basic link 102, the female ends 112 and 116 comprise bushings 140 and 142. Preferably, a sleeve bushing (bearing) 152 is positioned between the outer diameters of the male ends 110 and 114 and the inner diameters of female ends 132 and 136. The wheel 150 is a track-contact member that interfaces track walls as the chain moves.

Although the use of the universal or "offset" type link with one male end and one female end is a significant feature, the integral pivot-bearing feature could also be embodied in conventional inner/outer link plates, with the male ends integral to the outer plate, and the female ends integral to the inner plates. However, in applications having, for example, carriage-mounting bosses, an odd number of chain pitches apart, this will necessitate a parts count of four distinct link plates rather than two with the universal links. The universal link also has the advantages of smaller space envelope and support on every tooth of the drive sprocket versus every other one (on inner plates) in conventional chain.

The integral pivot-bearing feature could also be designed into a forged metal chain, although in the usual forged product the depth of the male boss might prove a difficulty. A forging would typically require a secondary machining operation to render the bearing surfaces accurately cylindrical, concentric and smooth enough to function. In injection molded plastic, by contrast, one can directly mold sufficiently cylindrical and smooth surfaces to serve as a rotating bearing. Furthermore, a forging would typically require secondary operations to produce any features with undercuts, such as the female threads in carriage mounting bosses 124 and 126. In the injection molding process, one can mold such features directly by means of mold inserts.

Fitting the male ends 110 and 114 into the female ends 132 and 136 allows drive tension, from operating the towline, to be carried entirely by the links 102 and 104. Thus, shear force on the link pin 118 is eliminated. The sole function of the pin 118 is to hold the assembled chain together. The pin 118 can be retained by a simple, reusable snap ring (not shown) that can be installed or removed with a common type of pliers. Any element of the chain can be replaced with the chain in place. The pin can be replaced with the chain under tension. Assembly can be carried out by hand, without the requirement of high forces. This ease of replacement is to be contrasted with the effort required for conventional steel chains, which usually require a hydraulic tool to crimp or remove a heavy pin retainer.

The link plates 106 may be provided with a counterbore (not shown) at the outer end of the pin hole 138. The counterbore accommodates the flush head of the pin on one side of the assembled pair and the pin retainer arrangement, e.g., washer and snap ring, on the other. With the counterbore, nothing projects outside the profile of the link.

Forming chain sections from combinations of plain links 102 and carriage links 104 allows carriage links to be placed only where needed while reducing manufacturing costs through uniformity of the plain links.

To assemble the chain, the male ends of an opposed pair of linkplates are rotated relative to each other to provide access to the bosses, then the sleeve bushing is positioned, then the female ends are positioned. Next the male ends are pulled slightly apart and rotated back into alignment; the male end is then allowed to close into the sleeve, which is positioned in the female ends.

This step of closing the chain loop can be accomplished by leaving the last few pins loose so that the last few link pairs are free to move apart, and can be facilitated by use of cumulative tolerances in the assembly. In the preferred nonmetallic embodiment, it is also facilitated by the flexibility of the link material itself.

Track Contact Member

The use of the integral link pivot bearing, e.g., male ends 114 and 110 inserted into female ends 132 and 136, lends itself to several possible track-contact member 150 configurations. In the embodiment illustrated in the FIGURE, the wheel or roller 150 contains a ball bearing for low rolling resistance and significantly reduced total drag in the chain. In lightly loaded applications, the rotating wheel or roller 150 shown in the FIGURE may be replaced with a sliding member. The link 102 can also be made with a stronger (heavier wall) female end 112, mating pairs of which are surrounded by a wear ring, preferably made of the same lubricated material as the pivot bearing bushing 152 and mounted in such a manner, e.g. on flats or splines, as to resist rotation. Like the pivot bushing 152, this wear ring assists in aligning the female ends 132 and 136. Wear rings bear against teeth of drive sprockets, where there is little or no sliding contact, and against the inner walls of the guiding track, where there is sliding contact. The resistance to sliding wear of these wear annuli is comparable to that of the conventional rolling wheel. In this sliding version, sliding contact is simply transferred from the wheel/female end interface to the wear ring/track interface. As the wear plates of tracks are preferably separate pieces, they can be replaced as they are worn with no need to replace the entire link plate. They can be replaced with the chain in place. The functioning of the track-contact member, shown as wheel 150 in the FIGURE, depends on friction between the wheel and the track being greater than friction between the wheel and the integral pivot bearing, e.g., male end 114 and female end 136. One approach is to insert a bearing liner of lubricated material; another approach is to coat the female link outer diameter with a low friction coating, containing for example titanium carbide or molybdenum disulfide. In the illustrated embodiment, the wheel 150 is supported on the steel ball bearing race 148. Dimensions are chosen so that the male link (114 and 110) bosses meet on the center plane, and the female ends bottom on the inner bearing race, thereby holding link ends in correct alignment.

Another configuration for the wheel 150 is an annulus made to a fairly loose running fit on the outer diameter of the mated female ends 132 and 136. The wheel 150 should be of an appropriate material (e.g. acetal) such that the coefficient of friction of the wheel material on that of the link will be less than that of the wheel material on the track. Alternatively, a thin bearing sleeve of a lubricated material may be interposed between the wheel 150 and the female ends. In the event the wheel 150 fails to rotate about the link end, the sliding contact is transferred to the wheel-track interface. In conventional steel tracks, sliding the wheel on the track leads to unacceptable friction heating.

Rotation of the Chain Links

Ideally, the male end 110 and female end 132 will run on each other with little enough friction and wear to give acceptable service life. In light duty service, many polymers will be adequately self-lubricating. However, reinforced materials needed for heavy-duty applications contain enough reinforcement (typically 40 to 50 percent glass) to abrade each other rapidly; this was a limiting factor in early development of the chains of the invention. Also, similar materials running against each other tend to develop higher friction coefficients and, in the case of the thermoplastics, ultimately run the risk of welding together under high loads. Hence, in the embodiment of the FIGURE a separate bearing element 152 has been introduced in order to minimize any possible friction and wear due to abrasion at the moving surfaces. This bearing 152 consists of a simple, thin-walled cylinder or bushing of highly lubricated, dissimilar material inserted and captured between the male and female ends 132 and 136 of adjoining links 102 and 104. In the preferred embodiment, this bushing 152 is a cutout segment of extrusion molded thermoplastic such as acetal (e.g. Deirin®, Celcon®) or an injection molded thermoplastic, e.g. thermoplastic polyurethane, heavily loaded with solid lubricant particles. Either of these methods of producing the bushing has the advantage of fine control over the inner and outer diameters of the bushing 152, by incrementally modifying the mold or extrusion die. This process enables highly repeatable fitting of the bushing to the link ends in production for any desired degree of tightness in the final assembly, i.e. one can build in a little preload so that bearings break in to maximum true contact area.

In any case, however, it is important to performance and service life in many applications to provide a tight enough fit of bushing to female end to efficiently distribute the drive tension load over the female end surface. A loose fit of bushing to female end will result approximately in line contact on the centerline, which is coincident with the knitline for this symmetrically molded part, and hence in a concentrated force to bend and break open the female end right at its weakest point. If rotation of the reinforced member were objectionable, both male and female could be provided with tight fitting bushings, with rotational movement taking place between the latter.

The sleeve bearing bushing 152 positively aligns the four link ends (110, 114, 132 and 136) for accurate concentricity in rotation, and eases insertion of the pin 118. The sleeve bearing bushing 152 can be engineered to improve compliance of the chain assembly in planes perpendicular to that of articulation, an advantage for backfit in older existing systems where segments of the guiding track may be out of alignment in these planes. In some applications, the sleeve 152 is provided with an anti-rotation stub coupled to at least one of either of the male ends (110 or 114) or to at least one of either of the female ends (132 or 136). In general, the sleeve bushing 152 is free to rotate relative to both the female ends and the male ends.

Molding the Links

In a preferred embodiment the plates 106 and 108 are made of a fiber-reinforced molded plastic, to be described below. The replacement of metal (steel) chain by a lightweight non-metallic chain to be used in heavy duty, industrial or commercial, applications is made possible by utilizing molding techniques to orient the reinforcement in the direction of the local principal tensile stress. If reinforcement is not oriented in the direction of the local tensile stress, the reinforcement will be oriented more or less across this direction and, due to the low tensile strength of the bond between the matrix and the reinforcing fibers in the normal direction, the macroscopic strength of the reinforced material in critical areas will actually be less than that of unreinforced matrix material. Optimal fiber alignment will develop the greatest strength under load given the shape and mass of the finished part. Fiber alignment is the critical factor in achieving the performance, on a strength-to-weight basis, that exceeds that of metals, and is a primary reason for utilizing reinforced composites.

Given the shape and mass of the finished part, optimal alignment of the reinforcing fibers will develop the greatest strength under load. An improper flow pattern can lead to presentation of abrasive fiber ends normal to bearing surfaces. This can lead to rapid wear. Reinforcing fibers tend to orient with the flow direction during mold fill. By appropriate gating and venting of the mold, using techniques well known in the art, the flow direction of the injected material can be controlled and hence the reinforcing fibers caused to align in the direction of the local principal tensile stress.

The illustrated configuration is particularly well adapted to take advantage of conventional molding techniques to align the reinforcing fibers in the direction of local tensile stress: The general bar-like shape of the link plate 106 lends itself to gating and venting at opposite ends, well known in the prior art, that tends to orient the reinforcing fibers along the length of the plate, i.e. the direction of applied chain tension.

It is possible to configure the gate and vent so as to satisfy at once all requirements for fiber orientation in the local tensile direction, confinement of knitlines to noncritical areas, and avoidance of fiber ends oriented normal to bearing surfaces. In the preferred embodiment, a so-called diaphragm gate is used centered on the male boss to cause the molded material to first flow down into the boss, then back up the sides of the boss, and only then into the middle portion of the link, ensuring the boss volume fills and the highly stressed fillet at the base of the boss is well packed. With this gating arrangement, the tendency of the flow to rotate while moving down into the boss also tends to orient fibers in the preferred tension direction within the flat face of the boss.

As seen in the FIGURE, the thickness in the region of the integral bearing feature maintains a fairly consistent cross-sectional area throughout the link plates 106, 108, 120, 122. This is well established in the prior art as good practice for mold filling and packing without the flow freezing off at narrow sections. Consistent cross-sectional area also gives approximately uniform stresses throughout the part under applied tension.

The 'I' section of the middle part 160 of the link has several important features. It gives the maximum overall cross-sectional area consistent with the greatest practicable molded section thickness (typically about 13 mm for most heavily reinforced thermoplastics). It is symmetric about the mold parting line, which helps to minimize distortion during post-mold cooling. Finally, the "I" section provides a surface to be supported on the side of the drive sprocket tooth in horizontal loop applications such as package sorters. The ribs 162 and 164 also provide support for such features as carriage bolting bosses when these are molded into the outer surface as at rib 164.

Any design feature, such as the female end 112, 132, that causes the flow of injected material to split will cause knitlines, or weldlines, where the flowpaths rejoin. Reinforcing fibers are oriented largely along knitlines and hence the knitlines are weak points when the local tensile stress is across them, at right angles to the fibers. This is well known in the art. It is possible to mitigate this problem by so-called "puddle venting" which effectively extends the knitline outside the boundary of the part proper and at least keeps the flow from stagnating altogether at the knitline.

Chain Composition

While the chain design described above could be executed in steel or other metal, there are significant advantages to using polymer compositions.

It is vital to the successful application of plastics to chain designs that the polymer compositions have physical properties comparable to the metals usually used. In particular, tensile strength, fracture toughness, and abrasion resistance must be considered. Of course, the design of the chain elements may be modified to accommodate the difference in physical properties between steel, for example, and a polymer, but in general if a polymer chain is to replace a steel chain, it must meet the same requirements.

In the present invention, the polymer composition used in the chain elements described above may be varied, depending on the load to be imposed and the physical design of the chain itself and the other components of the conveyor system. The original prototype of the chain described above was designed for a conveyor system in which a proof load of 10,000 pounds was specified. For this heavy load, it was found that the polymer composition could be met by using the commercially available IXEF® glass-filled thermoplastic polyarylamide supplied by Solvay S. A.; in particular, IXEF® Compound 1622 was used. This material provides both the tensile strength and the impact toughness needed to replace steel chain. The IXEF® Compound 1622 contains, per specification, 50 volume percent glass fibers, and has been modified by the addition of an elastomer to provide the needed resilience. The elastomer additive also increases the coefficient of friction of the material against inserted bolts, providing a measure of locking.

While it has been found that the IXEF® polyarylamide polymers are especially useful in the particular chain design that has been described, other polymers and polymer formulations may be considered, in situations where the chain design may be modified to suit the physical properties of the polymers chosen. For example, fiber reinforced thermoplastic polyurethanes, polyamides, polyamide-imides or polyesters may be selected for the polymer matrix. Glass fibers may be used to improve tensile strength as in the IXEF® polymers, but other fibers may be substituted that have different properties. For example, carbon fibers, which are generally stronger than glass fibers and electrically conductive, may be used. Aramid fibers such as Kevlar® also may be used. It will be understood by those skilled in the art that the choice of the polymer matrix and the fiber reinforcement may be made taking into account the physical properties needed for the particular application, the chain design, and the cost of the materials and their fabrication.

Since the load placed on the chain is transferred from one section of the chain to another while the surfaces of the glass-filled polymer move against each other, abrasion will result caused by the glass fibers against the polymer. Preventing abrasion from resulting in early failure of the chain elements is important to the chain design. One useful method has been described above, which involves using a steel ball bearing 148 to carry the wheel 150. The ball bearing element is molded into the wheel 150 so that when the chain links are assembled the wheel 150 rotates on the ball bearing race rather than against the female ends 132 and 136. Another method of avoiding early failure caused by abrasion of the glass-filled polymer is to place a self-lubricating polymer sleeve as described above between the moving chain elements. Such sleeves may be made of thermoplastic or thermoset polymers, such as acetal, for the matrix, with additives such as polytetrafluoroethylene (Teflon®), titanium carbide, or fluorinated ultrahigh molecular weight polyethylene powders added as required to provide sufficient lubrication. In the sole FIGURE, both the steel ball bearing race and the self-lubricating sleeve bearing are used. It will be understood that both, either one, or neither of these features may be used depending on the design requirements in any particular chain application.

The foregoing description of the invention is illustrative and explanatory; various modifications and alterations to the embodiments disclosed herein will be apparent to those skilled in the art in view of this disclosure. It is intended that all such variations and modifications fall within the spirit and scope of this invention as claimed.

What is claimed is:

1. A chain comprising:
   a first link comprising
      a first member comprising
         a female end, and
         a male end, and
      a second member comprising
         a female end opposing the female end of the first member,
         a male end opposing the male end of the first member; and
   a second link comprising:
      a first member comprising
         a female end receiving the male end of the first member of the first link, and
      a second member comprising
         a female end opposing the female end of the first member of the second link and receiving the male end of the second member of the first link, and
         a male end opposing the male end of the first member of the second link,
      wherein the male ends of the first link are rotatable relative to the female ends of the second link and form a pivot bearing connecting the first link and the second link.

2. The chain of claim 1, wherein the female end of the first member of the second link comprises a boss extending toward the female end of the second member of the second link and the female end of the second member of the second link comprises a boss extending toward the female end of the first member.

3. The chain of claim 2, wherein the male end of the first member of the first link extends though the boss of the female end of first member of the second link and the male end of the second member of the first link extends through the boss of the female end of the second member of the second link.

4. The chain of claim 3, wherein the female ends of the second link are maintained in spaced apart relation.

5. The chain of claim 2, comprising a track-contact member around the bosses of the female ends of the second link.

6. The chain of claim 5, wherein the track-contact member is rotatable relative to the bosses of the female ends.

7. The chain of claim 6, wherein the track-contact member is a wheel.

8. The chain of claim 1, comprising a pivot bearing bushing positioned between the female ends of the second link and the male ends of the first link.

9. The chain of claim 1, comprising a pin connecting the male end of the first member of the first link and the male end of the second member of the first link, said pin being non-load bearing.

10. The chain of claim 9, wherein the male end of first member of the first link contacts the male end of the second member of the first link.

11. The chain of claim 1, wherein at least one of the first link and the second link is molded from a polymer composition.

12. The chain of claim 11, wherein said polymer composition is fiber reinforced, said fibers being aligned in the direction the load is applied to the chain.

13. The chain of claim 12, wherein said polymer composition comprises a polyarylamide as a matrix for said reinforcing fibers.

14. The chain of claim 11, wherein said polymer composition comprises at least one member of the group consisting of polyurethanes, polyamides, polyamide-imides and polyesters.

15. The chain of claim 13, wherein said reinforcing fibers are glass fibers.

16. The chain of claim 12, wherein said reinforcing fibers are at least one member of the group consisting of glass fibers, carbon fibers, and aramid fibers.

17. A chain of claim 5 wherein said track-contact member is located axially by bosses of the female ends of said first and second members and aligns said female ends.

18. A chain of claim 1 wherein said female end and said male end are connected by a middle portion having an I-shaped cross-section.

19. a chain of claim 18 wherein said middle portion comprises a rib comprising one or more integral bosses extending from the member away from the boss of the male end, said one or more bosses for connecting said member to an associated unit.

20. A chain comprising:
a first link comprising a first member having a male end comprising a boss extending perpendicular to a plane in which the first member rotates;
a second link comprising a first member having a female end comprising a boss extending parallel to the boss of the male end of said first member of said first link for receiving the boss of said male end, wherein the female end pivots about the boss of said male end;
a pin positioned through the boss of the male end of said first member of said first link wherein:
the first link comprises a second member opposing the first member of the first link;
the second link comprises a second member opposing the first member of the second link; and
the pin connects the male end of the first member of the first link to the second member of the first link, said pin being non-load bearing.

21. The chain of claim 20, comprising a self-lubricating non-metallic sleeve bearing between the male end boss and the female end, said sleeve bearing maintaining alignment of the links.

22. The chain of claim 20, comprising a track-contact member around the boss of said female end, said track-contact member being located axially by said female boss and aligning the male bosses of the first and second members of said first link.

23. A chain comprising:
a first link comprising first and second opposing members comprising opposing first and second male end bosses; and
a second link comprising first and second opposing members comprising opposing first and second female end bosses, the female ends respectively receiving the first and second male end bosses, wherein the female ends pivot relative to the male ends.

24. The chain of claim 23, comprising a pin connecting the first and second male end bosses.

25. The chain of claim 24, comprising an annular bearing between the first and second female end bosses.

26. The chain of claim 25, comprising a wheel positioned around and rotatable relative to the first and second female end bosses, wherein the annular bearing is positioned between the wheel and the first and second male end bosses.

27. The chain of claim 26, comprising a sleeve bearing between the first and second male end bosses and the first and second female end bosses.

28. The chain of claim 26, wherein the annular bearing is positioned at an intersection of the first and second male end bosses.

29. The chain of claim 23, comprising a sleeve bearing between the first and second male end bosses and the first and second female end bosses.

30. A chain kit comprising:
a first member comprising a female end and a male end having a boss;
a second member substantially identical to the first member;
a third member substantially identical to the second member; and
a fourth member comprising a female end substantially identical to the female end of the first member and a male end having a boss, the male end being substantially identical to the male end of the first member, and
wherein:
the fourth member comprises carriage-connecting structure between the female end and the male end; and
the female ends are adapted to receive the bosses of male ends to form an integral pivot bearing between adjacent members.

31. A chain comprising:
a first link comprising first and second opposing members comprising opposing first and second male end bosses; and
a second link comprising first and second opposing members comprising opposing first and second female end bosses, the female ends respectively receiving the first and second male end bosses, wherein the female ends pivot relative to the male ends, said links being connected by a non-load bearing pin through the first and second male end bosses.

32. The chain of claim 31, comprising a pivot bearing bushing or low friction coating between the female ends of the second link and the male ends of the first link.

33. The chain of claim 31, further comprising a wheel positioned around and rotatable relative to the first and second female end bosses, wherein an annular bearing or low friction coating is positioned between the wheel and said first and second female end bosses.

34. The chain of claim 33, wherein said annular bearing is a ball bearing race between said wheel and the first and second male end bosses and the first and second female end bosses.

35. The chain of claim 34, wherein a pivot bearing bushing is positioned between said ball bearing race and said first and second male end bosses.

36. The chain of claim 32, wherein said pivot bearing bushing is between said female ends of the second link and the male ends of the first link.

* * * * *